(12) United States Patent
Ohgi

(10) Patent No.: US 7,484,232 B2
(45) Date of Patent: Jan. 27, 2009

(54) DISC CARTRIDGE, AND METHOD OF INSTALLING SHUTTER TO SAME

(75) Inventor: Takashi Ohgi, Miyagi (JP)

(73) Assignee: Sony Corporation, Tokyo (JP)

( * ) Notice: Subject to any disclaimer, the term of this patent is extended or adjusted under 35 U.S.C. 154(b) by 443 days.

(21) Appl. No.: 11/301,188

(22) Filed: Dec. 12, 2005

(65) Prior Publication Data

US 2006/0143641 A1 Jun. 29, 2006

(30) Foreign Application Priority Data

Dec. 10, 2004 (JP) ............... 2004-359012

(51) Int. Cl.
*G11B 23/03* (2006.01)
(52) U.S. Cl. ...................... 720/739
(58) Field of Classification Search ......... 360/133; 720/738–744
See application file for complete search history.

(56) References Cited

U.S. PATENT DOCUMENTS

| | | | | |
|---|---|---|---|---|
| 5,272,693 | A * | 12/1993 | Fujisawa | 720/739 |
| 6,307,711 | B1 * | 10/2001 | Higuchi et al. | 360/133 |
| 6,721,266 | B1 * | 4/2004 | Kobayashi et al. | 720/738 |
| 2003/0142443 | A1 * | 7/2003 | Kobayashi et al. | 360/133 |
| 2006/0075410 | A1 * | 4/2006 | Ohgi et al. | 720/600 |
| 2006/0080698 | A1 * | 4/2006 | Kurita et al. | 720/738 |
| 2006/0150205 | A1 * | 7/2006 | Ohgi | 720/600 |

FOREIGN PATENT DOCUMENTS

| | | | |
|---|---|---|---|
| JP | 09171668 A | * | 6/1997 |
| JP | 10326472 A | * | 12/1998 |

* cited by examiner

*Primary Examiner*—William J Klimowicz
(74) *Attorney, Agent, or Firm*—Wolf, Greenfield & Sacks, P.C.

(57) ABSTRACT

The present invention provides a disc cartridge, in which a shutter member can easily be installed to a cartridge body. The disc cartridge includes a body housing a rotatable disc, a driving aperture, a write and/or read aperture, and the shutter member. The shutter member includes a shutter plate portion, a movement guide piece, support pieces, a sliding guide portion, and engagement pieces. The shutter plate portion opens and closes the write/read aperture. The support pieces are spaced in a sliding direction of the shutter plate portion, are bent from the movement guide piece and supported on the sliding guide portion. The engagement pieces project towards the support pieces to the shutter plate portion holding the sliding guide portion between the engagement pieces and the support pieces. The sliding guide portion includes a guide recess and a guide rail portion. A tapered cut is formed in the guide recess.

8 Claims, 7 Drawing Sheets

DISC CARTRIDGE, AND METHOD OF INSTALLING SHUTTER TO SAME

CROSS REFERENCES TO RELATED APPLICATIONS

The present invention contains subject matter related to Japanese Patent Application JP 2004-359012 filed in the Japanese Patent Office on Dec. 10, 2004, the entire content of which is incorporated herein by reference.

BACKGROUND OF THE INVENTION

1. Field of the Invention

The present invention relates to a disc cartridge that houses a disc such as optical disc, magneto-optical disc or the like, and a method of assembling a shutter to the disc cartridge.

2. Description of the Related Art

In the past, there are widely used disc cartridges each of which has a disc-shaped recording medium such as optical disc housed rotatably therein and is to be loaded in a disc recording and/or playback apparatus with the disc-shaped recording medium being kept housed in the disc cartridge. The disc cartridge of this type can protect the disc-shaped recording medium housed in a body thereof, and facilitate loading and unloading of the disc-shaped recording medium into and from the disc recording and/or playback apparatus.

In many disc cartridges of this type, the body thereof housing a disc-shaped recording medium is formed from a pair of upper and lower halves molded from a synthetic resin and butt-joined to each other. Also, to enable the disc cartridge to be inserted into a disc recording and/or playback apparatus with the disc-shaped recording medium being kept housed in the body, the cartridge body has formed therein a driving aperture through which the disc-shaped recording medium is to face a turn-table included in a disc rotation driving mechanism that rotates the disc-shaped recording medium, and a write and/or read aperture through which part of the signal recording area of the disc-shaped recording medium is exposed to outside in a range between inner and outer radii thereof.

To protect the disc-shaped recording medium housed in the body of the disc cartridge, it is proposed to provide, on the disc cartridge body, a shutter member to open and close at least the write and/or read aperture (as in the Japanese Patent Application Laid Open No. 2003-2813880. The shutter member is installed slidably on one of laterals sides of the cartridge body. The disc cartridge is slid by a shutter moving mechanism also provided on the body in a direction to close the write and/or read aperture before the disc cartridge is inserted into the disc recording and/or playback apparatus, and in a direction to open the write and/or read aperture after the disc cartridge is inserted into the disc recording and/or playback apparatus.

However, installation of the shutter member on any of the upper and lower halves of the cartridge body, not yet butt-joined to each other, will complicate a next step in which the pair of halves is butt-joined to each other. That is, the shutter member has to be installed after the upper and lower halves are butt-joined to each other.

On this account, the shutter member should be constructed to easily be installable to the cartridge body formed from the upper and lower halves butt-joined together and not to be disengageable from on the cartridge body when being slid.

SUMMARY OF THE INVENTION

It is therefore desirable to overcome the above-mentioned drawbacks of the related art by providing a disc cartridge provided with a shutter member easy to install on a body of the disc cartridge and which is not disengageable while being slid, and a method of assembling the shutter member to the disc cartridge.

According to the present invention, there is provided a disc cartridge including: a body having a disc housed rotatably therein; a driving aperture through which a disc rotation driving mechanism to rotate the disc accesses the disc in the cartridge body and a write and/or read aperture through which information signals are to be written to or read from the disc, both apertures being formed at one side of the cartridge body; a shutter member including a shutter plate portion to open and close the write and/or read aperture, movement guide piece formed to rise form the shutter plate portion, support pieces provided in a plurality of places spaced from each other in the sliding direction of the shutter plate portion and which are bent from the movement guide piece and supported on a sliding guide portion of the disc cartridge, and engagement pieces projected toward the support pieces to the shutter plate portion to hold the sliding guide portion between themselves and the support pieces; the sliding guide portion including a guide recess in which the support pieces of the shutter member are to be inserted to be slidable and a guide rail portion on which the engagement pieces are fitted and which supports the shutter member to be slidable; and a cut formed in the guide recess formed to have such a taper that the depth thereof at the upstream side in the direction to open the write and/or read aperture is larger than that at the downstream side.

According to the present invention, there is also provided a method of assembling a shutter member to a disc cartridge, the disc cartridge including: a body having a disc housed rotatably therein; a driving aperture through which a disc rotation driving mechanism to rotate the disc accesses the disc in the cartridge body and a write and/or read aperture through which information signals are to be written to or read from the disc, both apertures being formed at one side of the cartridge body; a shutter member including a shutter plate portion to open and close the write and/or read aperture, movement guide piece formed to rise form the shutter plate portion, support pieces provided in a plurality of places spaced from each other in the sliding direction of the shutter plate portion and which are bent from the movement guide piece and supported on a sliding guide portion of the disc cartridge, and engagement pieces projected toward the support pieces to the shutter plate portion to hold the sliding guide portion between themselves and the support pieces; the sliding guide portion including a guide recess in which the support pieces of the shutter member are to be inserted to be slidable and a guide rail portion on which the engagement pieces are fitted and which supports the shutter member to be slidable; and a cut formed in the guide recess formed to have such a taper that the depth thereof at the upstream side in the direction to open the write and/or read aperture is larger than that at the downstream side, the method including the steps of: inserting, with the shutter member being held at a slant, the support pieces into the cut at the deep side from the upstream side in the direction to open the write and/or read aperture; and fitting the engagement pieces into the guide recess in the guide rail portion for the support and engagement pieces to catch the guide rail portion between them.

In the above disc cartridge and method of assembling the shutter member to the disc cartridge, the support piece are inserted into the cut with the shutter member being held at a slant. Since the support piece will have the bent longer portion thereof inserted at a deeper side of the cut, the longer portion can easily be inserted and the support piece be easily inserted into the cut while being led by the longer portion. Next, the engagement piece inserted in the cartridge body can be fitted onto the guide rail portion from an assembling aperture.

DETAILED DESCRIPTION OF THE PREFERRED EMBODIMENTS

Figure 1:
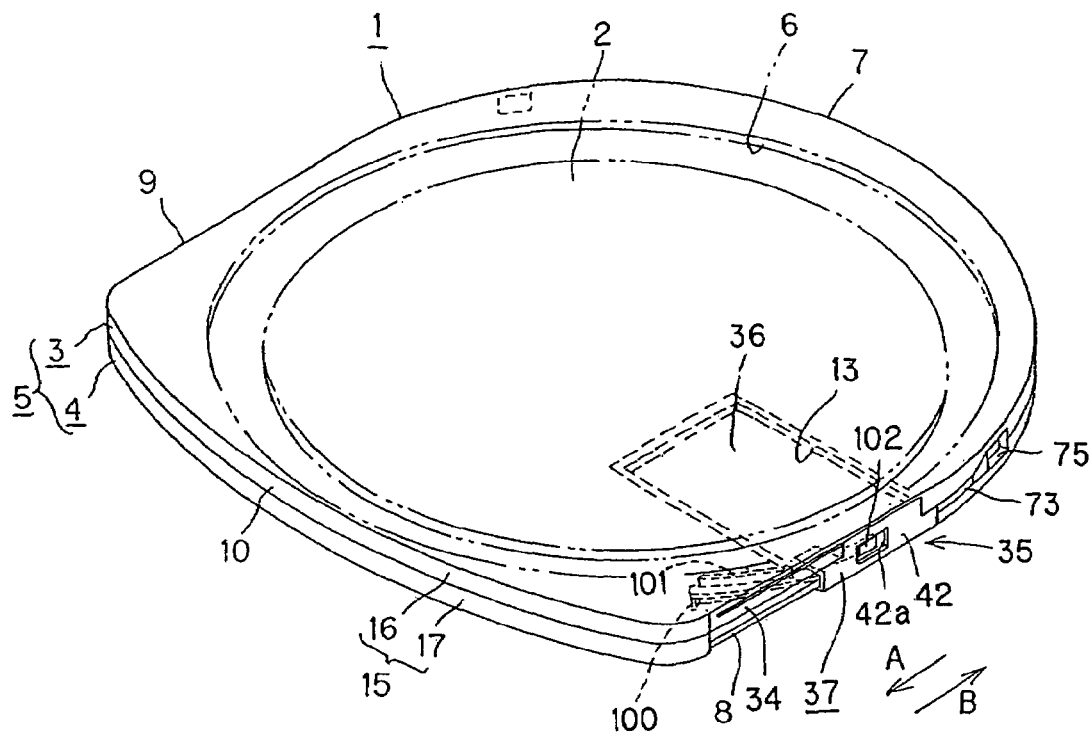
FIG. 1 is a perspective view, from the upper half, of the disc cartridge according to the present invention.
Figure 2:
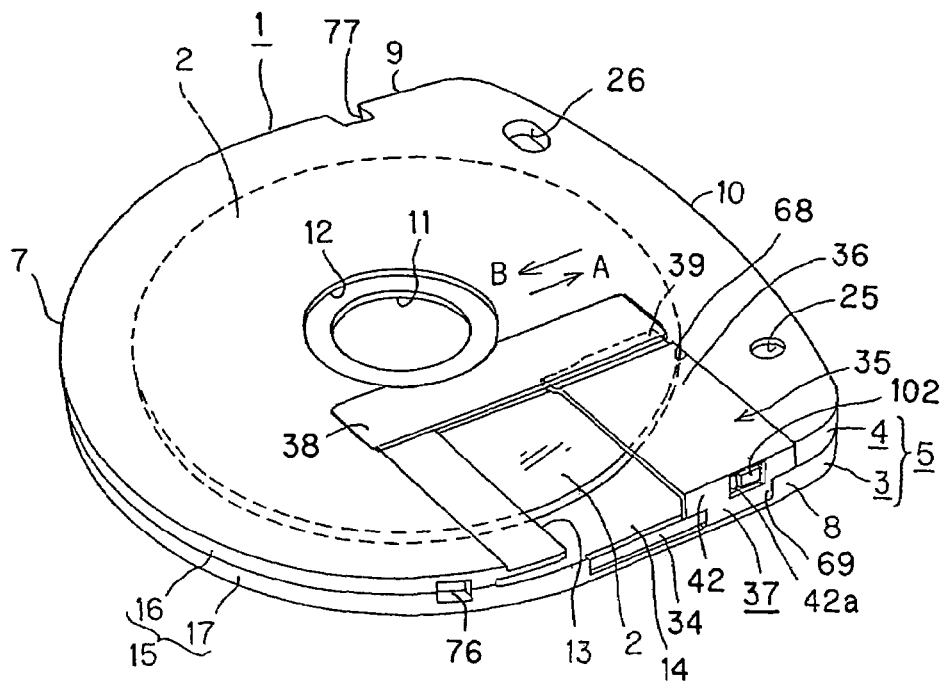
FIG. 2 is a perspective view, from the lower half, of the first disc cartridge in FIG. 1.

The disc cartridge according to the present invention will be described in detail below with reference to the accompanying drawings. Referring now to FIGS. 1 and 2, there is schematically illustrated a disc cartridge according to the present invention in the form of a perspective view. The disc cartridge, generally indicated with a reference numeral 1, has housed therein, for example, an optical disc 2 as a disc-shaped recording medium. As shown, the disc cartridge 1 includes a body 5 formed from a pair of body halves 3 and 4, upper and lower, butt-joined to each other. The optical disc 2 is housed rotatably in the cartridge body 5.

The disc cartridge 1 according to the present invention houses an optical disc 2 having recorded therein program data and video data for performing a video game, for example. It is designed extremely small. The disc cartridge 1 has housed therein an optical disc 2 of about 60 mm in diameter which is so small a size that it can be held as a whole in the palm of one hand.

Figure 3:
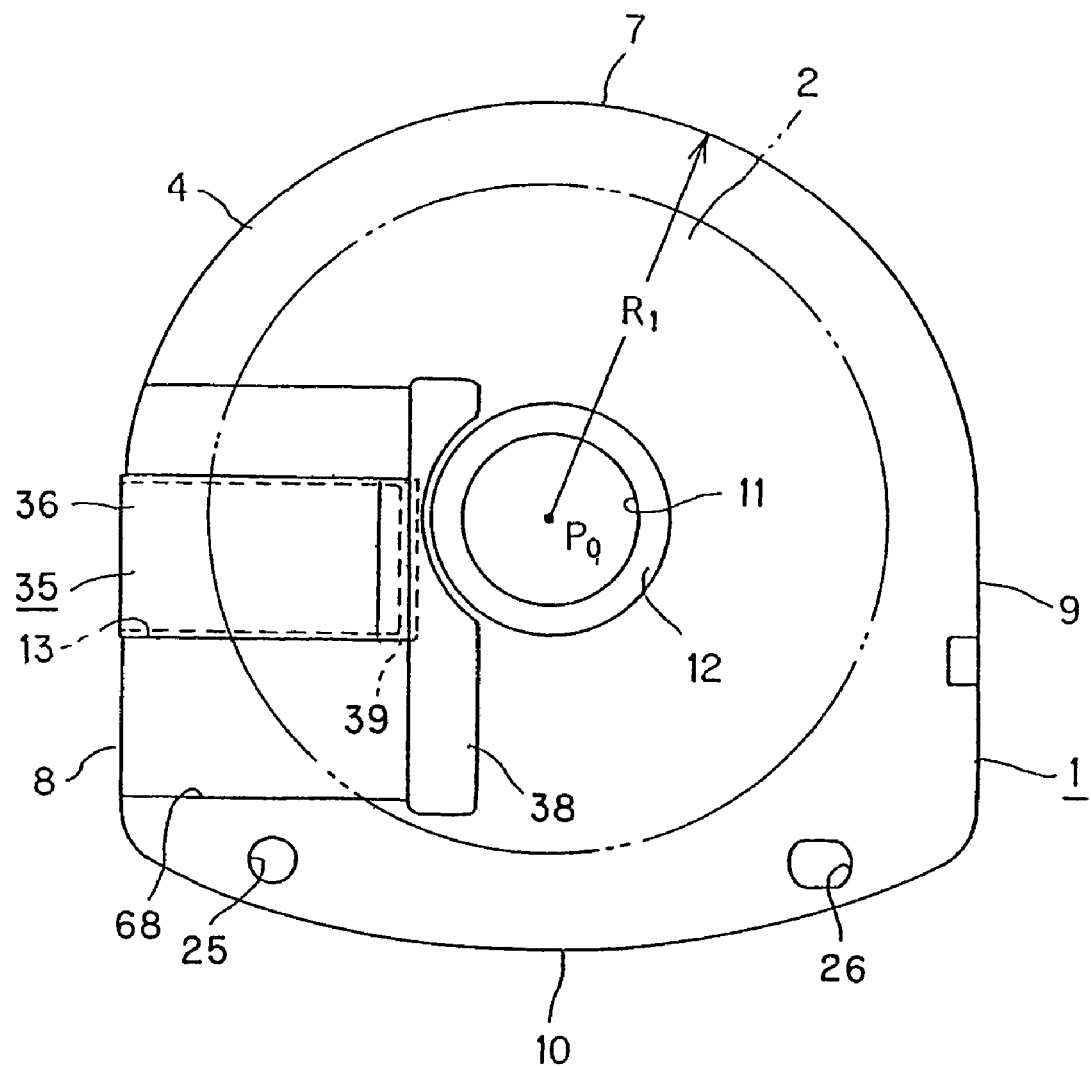
FIG. 3 is a plan view, from the lower half, of the disc cartridge in FIG. 1.

As shown in FIGS. 1 to 3, the cartridge body 5 of the disc cartridge 1 has a circular-formed front side 7 as one lateral side at which the disc cartridge 1 is first inserted into the disc recording and/or playback apparatus (will be referred to as "disc recorder/player" hereunder) compatible with the disc cartridge 1. As shown in FIG. 3, the circular front side 7 is generally a half of a circle taking, as its center, the center P0 of the optical disc 2 received in a disc receptacle 6 formed in the cartridge body 5 and which has a radius R1. That is, the circular front side 7 corresponds in shape to a half of the optical disc 2 received in the cartridge body 5.

Of the cartridge body 5, the circular front side 7 is contiguous at opposite ends thereof to lateral sides 8 and 9, respectively, opposite and parallel to each other, and these lateral sides 8 and 9 are contiguous to a rear side 10 opposite to the circular front side 7 and which is gently curved.

Of the disc cartridge 1 according to the present invention, the nearly semicircular front side 7 as one lateral side at which the disc cartridge 1 is to be first inserted into the disc recorder/player is formed largely curved as compared with the other sides. So, the largely curved front side 7 is a guide for correct slot-in insertion of the disc cartridge 1 into the disc recorder/player through a cartridge slot. Especially, in case of a disc cartridge 1 designed to have so small a size that the user can hold it as a whole in the palm of one hand, the user can easily know, by holding it in hand, at which side the disc cartridge 1 is to be first inserted into the disc recorder/player. Namely, the semicircular front side of the disc cartridge 1 will lead the user to insert the disc cartridge 1 correctly into the disc recorder/player. As will further be described later, the disc cartridge 1 can be inserted easily and correctly into a slot-in type disc recorder/player.

Further, since the disc cartridge 1 according to the present invention has the nearly semicircular front side 7 at which it is to be first inserted into the disc recorder/player and the curved rear side 10 opposite to the circular front side 7, so it can be designed more approximate in shape and size to the optical disc 2 that is to be housed therein.

Here will be described in further detail the upper and lower halves 3 and 4 butt-joined together to form the cartridge body 5. The upper and lower halves 3 and 4 are formed by molding a synthetic resin such as polycarbonate resin, ABS resin or the like.

The lower half 4 as the bottom of the cartridge body 5 has formed at the center thereof a circular central aperture 12 through which a central hole 11 formed at the center of the optical disc 2 housed in the cartridge body 5 and its rim are exposed to outside as shown in FIGS. 2 and 3. Part of a disc rotation driving mechanism provided at the disc recorder/player in which the disc cartridge 1 is to be loaded, for example, a turn-table, is to enter the central aperture 12. That is to say, the central aperture 12 is used as a driving aperture part of a mechanism to rotate the optical disc 2 is to enter.

Figure 4:
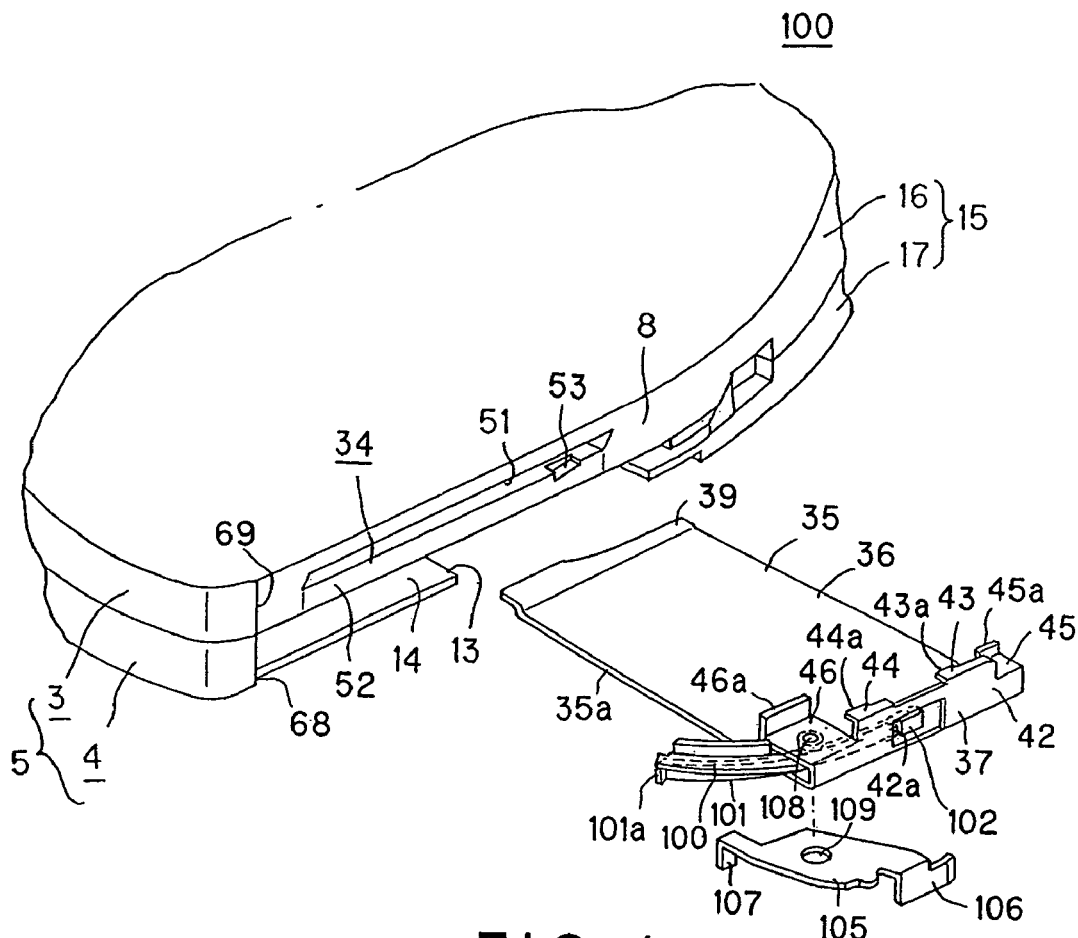
FIG. 4 is a perspective view of the shutter member and cartridge body on which the shutter member is installed.

As shown in FIGS. 2 to 4, the lower half 4 has also formed therein a write and/or read aperture 13 (will also be referred to as "disc-access aperture" hereunder). The disc-access aperture 13 is located at one (8) of the lateral sides (8 and 9) of the cartridge body 5, and formed rectangular extending from near the driving aperture 12 to the lateral side 8. That is, the disc-access aperture 13 is formed rectangular to have a sufficient size to expose part of the signal recording area of the optical disc 2 housed in the cartridge body 5 to outside in a range between inner and outer radii of the optical disc 2. It should be noted that the disc-access aperture 13 is open at the lateral side 8 as shown in FIG. 4. Since the disc-access aperture 13 is open at the lateral side 8 as above, the optical head can scan up to the outermost radius of the optical disc 2. Thus, the optical disc 2 can be designed to have a larger signal recording area, and hence an increased recording capacity of the optical disc 2. Also, since the disc-access aperture 13 is formed not directly contiguous to the central aperture 12 but with a connecting portion being left between the apertures 12 and 13, so the mechanical strength of the lower half 4 can be maintained.

Also, the opening at the lateral side 8 of the lower half 4 is an assembling aperture 14 through which a shutter member 35 to open and close the disc-access aperture 13 is assembled to the cartridge body 5. The assembling aperture 14 is located under a guide recess 51 formed in the upper half 3. When the shutter member 35 is assembled to a sliding guide portion 34 of the cartridge body 5, bent pieces and engagement pieces formed on a movement guide piece 42 of the shutter member 35 are inserted into the assembling aperture 14.

The surface of the upper half 3 butt-joined to the lower half 4 to form the top of the cartridge body 5, opposite to the optical disc 2, is flat having no opening or the like formed therein as shown in FIG. 1. Also, the upper half 3 has formed at the lateral side 8 of the cartridge body 5 the sliding guide portion 34 on which the shutter member 35 to open and close the disc-access aperture 13 is supported slidably as shown in FIGS. 1, 2 and 4. The sliding guide portion 34 and shutter member 35 will further be described later.

The cartridge body 5 has an outer peripheral wall 15 formed by butt-joining of rising peripheral walls 16 and 17 formed along the abutting surfaces, respectively, of the upper and lower halves 3 and 4. As shown in FIGS. 1 and 2, the rising peripheral walls 16 and 17 are formed along the outer edges of the upper and lower halves 3 and 4, respectively. On the abutment surface of part of each of the rising peripheral walls 16 and 17 at the semicircular front side 7 of the upper and lower halves 3 and 4, there are formed a plurality of engagement concavities and also a plurality of engagement convexities to be engaged in corresponding ones of the engagement concavities.

By putting the engagement concavities and corresponding convexities into abutment with each other and applying ultrasound to between the concavities and convexities to melt welding ribs, the rising peripheral walls 16 and 17 are welded to each other to form the outer peripheral wall 15 of the cartridge body 5.

On the inner sides of the upper and lower halves 3 and 4, opposite to each other, there are formed circular receptacle-defining walls which are butt-joined to each other to form a disc receptacle 6. Th receptacle-defining walls are formed along the curved rear side 10 of the cartridge body 5 to be circular contiguously to the rising peripheral walls 16 and 17 forming the circular front side 7 of the cartridge body 5. The receptacle-defining walls and rising peripheral walls 16 and 17 are butt-joined to each other to form the circular disc receptacle 6. Since the receptacle-defining walls and rising peripheral walls 16 and 17 are formed to surround the periphery of the optical disc 2 housed in the disc receptacle 6, they function to place the optical disc 2 in position inside the disc receptacle 6 and prevent any foreign matter from entering the disc receptacle 6, to thereby protect the optical disc 2 positively.

Further, the lower half 4 has formed at the opposite sides of the curved rear side 10 thereof first and second positioning holes 25 and 26 in which positioning pins provided at the disc recorder/player are to be engaged when the disc cartridge 1 is inserted into the disc recorder/player. It should be noted that the second positioning hole 26 is shaped as a hole elongated in the direction from the lateral side 8 to the lateral side 9 of the cartridge body 5 as shown in FIGS. 2 and 4 so that the engaged position of the corresponding positioning pin can be adjusted.

To form the cartridge body 5 by butt-joining of the upper and lower halves 3 and 4 constructed as above, the lower half 5 is held on a positioning jig and the engagement convexities of the lower half 4 are engaged in the engagement concavities of the upper half 3 to put the rising peripheral walls 16 and 17 into abutment with each other.

The upper and lower halves 3 and 4 thus positioned and put in abutment with each other are joined integrally to each other by fusing the welding ribs provided at the edges of the engagement concavities and rising peripheral wall 17 using an ultrasonic welder to form the cartridge body 5.

A portion 37 of the shutter member 35, which is to be supported on the disc cartridge body 5, is engaged slidably on the lateral side 8 of the cartridge body 5 constructed as above to form a sliding guide portion 34 that supports the shutter member 35 movably in the direction of arrow A or B in FIGS. 1 and 2 to open or close the disc-access aperture 13.

Figure 5:
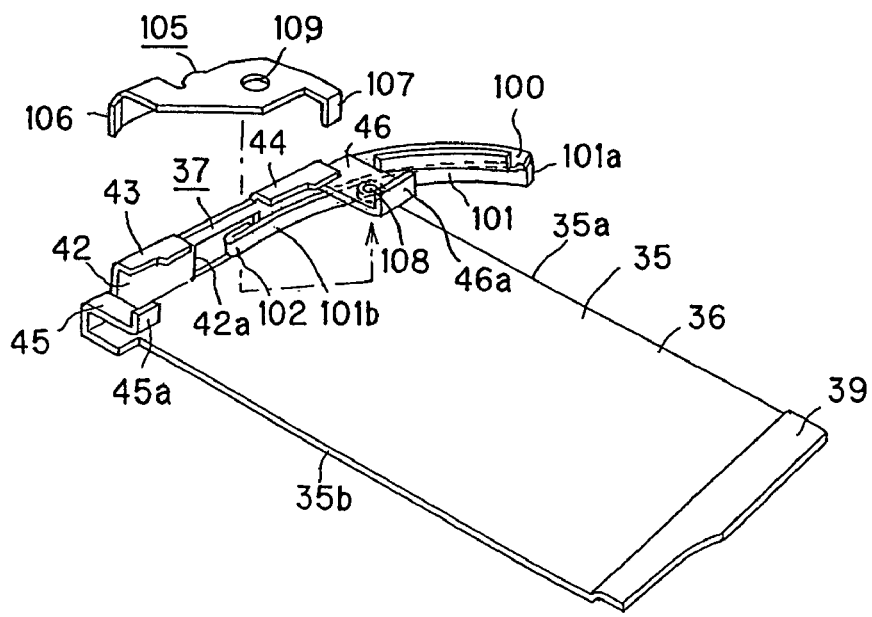
FIG. 5 is a perspective view of the shutter member.

The shutter member 35 to open and close the disc-access aperture 13 is installed on the sliding guide portion 34 as shown in FIGS. 1, 2 and 4. The shutter member 35 is formed by punching and bending a thin sheet metal or by molding a synthetic resin. It includes a flat shutter plate portion 36 formed to have a sufficiently large rectangular shape to close or cover the disc-access aperture 13, and the cartridge-supported portion 37 formed at the base end of the shutter plate portion 36 to have a C-shaped section. At the free end of the shutter plate portion 36, there is provided a guide support portion 39 supported on a shutter guide member 38 which is to be installed on the cartridge body 5. The guide support portion 39 is formed by bending the free end of the shutter plate portion 36 toward the cartridge body 5 as shown in FIGS. 4 and 5.

The cartridge-supported portion 37 provided on the shutter member 35 has a movement guide piece 42 formed to rise vertically from the base end of the shutter member 36, and the movement guide piece 42 has provided at the free end thereof two support pieces 43 and 44, first and second, bent toward the shutter member 36 and spaced from each other in the direction of the shorter side of the shutter member 35. Also, in places more outer than the positions where first and second support pieces 43 and 44 of the movement guide piece 42 are provided, there area provided two pieces, first and second, 45 and 46 bent in L shape in positions, respectively, one step lower than the places where the first and second pieces 43 and 44 are provided and spaced in the direction of the shorter side of the shutter member 35. The first and second bent pieces 45 and 46 have formed at their free ends first and second engagement pieces 45a and 46a, respectively, bent to project toward the first and second support pieces 43 and 44, respectively.

Figure 6:
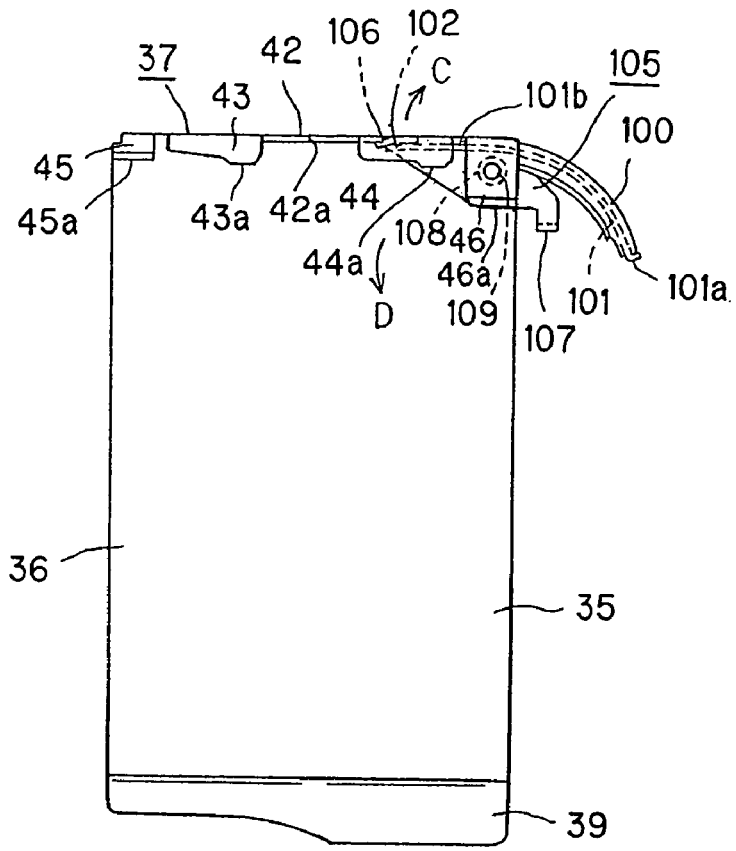
FIG. 6 is a plan view of the shutter member.

The first and second support pieces 43 and 44 formed bent from the free end of the movement guide piece 42 are engaged in a guide recess 51 formed in the sliding guide portion 34 of the cartridge body 5, which will further be described later, and thus supported slidably on the sliding guide portion 34. As shown in FIGS. 4 to 6, each of the first and seconds 43 and 44 is bent to have a longer portion at the downstream side in the direction of the shutter member 35 to open the disc-access aperture 13 while having a shorter portion at the upstream side in that direction, and thus has projections 43a and 44a, respectively, that project toward the free end of the shutter member 35. The projections 43a and 44a are to be inserted into the guide recess 51. With the shutter member 35 being held at a slant, the projections 43a and 44a can be inserted into a cut 53 formed in the guide recess 51. The cut 53 will be described in detail later. Thus, the first and second bent pieces 45 and 46 formed on the movement guide piece 42 are fitted on a guide rail portion 52 of the sliding guide portion 34, and the shutter member 35 is assembled to the sliding guide portion 34.

The first and second bent pieces 45 and 46 formed outside the first and second support pieces 43 and 44, respectively, are fitted on the guide rail portion 52 of the sliding guide portion 34 to hold the guide rail portion tight between themselves and first and second support pieces 43 and 44 and thus support the shutter member 35 slidably on the sliding guide portion 34. The first and second bent pieces 45 and 46 are inserted into the cartridge body 5 through the assembling aperture 14 formed in the lower half 4, pushed into the upper half 4 while sliding on the guide rail portion 52 formed on the sliding guide portion, and thus fitted onto the guide rail portion 52. As a result, the first and second bent pieces 45 and 46 are supported along with the first and second support pieces 43 and 44 slidably on the sliding guide portion 34.

As shown in FIGS. 4 to 7, a connecting arm 100 is provided extending from one side of the movement guide piece 42 included in the cartridge-supported portion 37 of the shutter member 35. That is, the connecting arm 100 is formed to extend from one side of the movement guide piece 42 positioned at the downstream side in the direction to open the disc-access aperture 13 when the shutter member 35 is installed on the cartridge body 5. Also, the connecting arm 100 extends from one side of the movement guide piece 42 while bending to extend along the outer periphery of the circular disc receptacle 6 when the shutter member 35 is installed on the cartridge body 5. That is, the connecting arm 100 extends while bending toward the free end of the shutter plate portion 36 where the guide support portion 39 is provided.

To the free end of the connecting arm 100, there is connected an elastic moving piece 101 fixed at the base end thereof to extend along the connecting arm 100. The elastic moving piece 101 is connected at the base end thereof to the free end of the connecting arm 100 by welding or bonding. At this time, the elastic moving piece 101 is positioned in relation to the connecting arm 100 with a bent portion 101a at the base end thereof being in abutment with the free end of the connecting arm 100.

Figure 7:
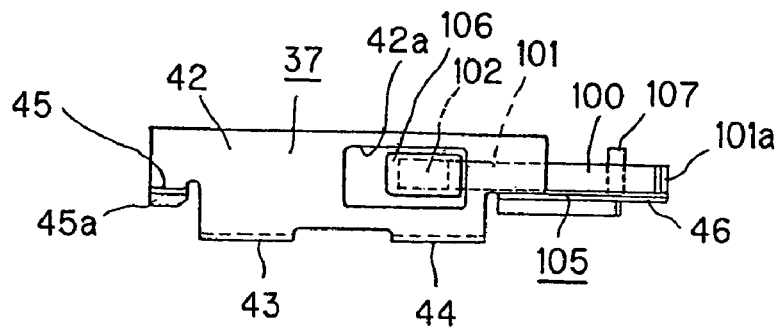
FIG. 7 is a front view of the shutter member.

Also, as shown in FIGS. 6 and 7, the elastic moving piece 101 is provided at the base end of the shutter plate portion 36 and formed to extend to a window 42a formed in the movement guide piece 42 opposite to the one lateral side of the cartridge body 5, and has a pressing piece 102 provided at the free end thereof which faces the window 42a. The pressing piece 102 is to be pressed by a shutter releasing piece as part of a shutter releasing mechanism provided at the disc recorder/player when the disc cartridge 1 is inserted into the disc recorder/player.

Further, the elastic moving piece 101 is connected to the connecting arm 100 so that it is applied with a force to project the pressing piece 102 from the window 42a with its free end being in abutment with the inner surface of the movement guide piece 42. That is, the elastic moving piece 101 is extended toward the movement guide piece 42 while being bent from the base end connected to the connecting arm 100, and has the free end thereof pressed to the movement guide piece 42. Thus, the elastic moving piece 42 is pressed in the direction of arrow C in FIG. 6.

The elastic moving piece 101 has a straight portion 101b extending in parallel with the movement guide piece 42. The connecting arm 100 and elastic moving piece 101 are so formed that the bent portion 101a will have a curvature generally identical to that of the inner surface of the rising peripheral walls 16 and 17 of the upper and lower halves 3 and 4, respectively, forming the corner of the curved side 10 of the cartridge body 5, that is, the curvature of the inner surface of the outer peripheral wall 15 of the cartridge body 5 when the shutter member 35 is in the position where it has opened the disc-access aperture 13. Thus, the shutter member 35 can be blocked by the repulsion of the elastic moving piece 101 from moving in the direction to close the disc-access aperture 13 when the shutter member 35 has opened the disc-access aperture 13.

The second bent piece 46 formed at the other side of the movement guide piece 42 has a shutter movement limiting member 105 installed thereon. As shown in FIGS. 4 and 5, the shutter movement limiting member 105 is formed by punching and bending a thin sheet metal. It includes a pressing portion 106 formed at one end thereof and an engagement portion 107 formed at the other end. The pressing portion 106 is formed by bending one end of the shutter movement limiting member 105 almost vertically. The pressing portion 106 is to be pressed by the shutter releasing portion which is part of the shutter releasing mechanism provided at the disc recorder/player when the disc cartridge 1 is inserted into the disc recorder/player.

Note that the pressing piece 102 provided at the free end of the elastic moving piece 101 is located inside the pressing portion 106 of the shutter movement limiting member 105 and is to press the pressing portion 106 in the direction of arrow C in FIG. 6.

Also, the engagement portion 107 is formed by bending the other end of the shutter movement limiting member 105 almost vertically. The engagement portion 107 is engaged on the movement limiter 61 provided at the cartridge body 5 when the shutter member 35 is installed on the cartridge body 5 to limit the shutter member 35 staying in the position to close the disc-access aperture 13 from moving in the direction to open the disc-access aperture 13.

When the shutter member 35 is installed to the cartridge body 5, the shutter movement limiting member 105 will be installed to the second engagement piece 46 with the pressing portion 106 being set opposite to the window 42a in the movement guide piece 42 opposite to the one lateral side 8 of the cartridge body 5 as shown in FIGS. 6 and 7. At this time, the engagement portion 107 at the other end will be positioned to project from the other side where the second bent piece 46a of the second bent piece 46 is provided.

Also, the shutter movement limiting member 105 has a through-hole 109 formed in the center thereof, and the second bent piece 46 has a cylindrical projection 108 formed by burring at the center thereof. By caulking the cylindrical projection 108 inserted in the through-hole 109 to crush its free end, the shutter movement limiting member 105 is installed to the second bent piece 46 pivotably about the projection 108.

When the shutter movement limiting member 105 is thus installed to the second bent piece 46 with the pressing portion 106 being positioned between the movement guide piece 42 and elastic moving piece 101, the rear side of the pressing portion 106 will be pressed by the elastic moving piece 101 and pivoted in the direction of arrow C in FIG. 6 in which the pressing portion 106 projects from the window 42a, and the engagement portion 107 will positively be engaged on the moving limiter 61 at the cartridge body 5. When the pressing portion 106 is pressed against the force of the elastic moving piece 101, the shutter movement limiting member 105 will be turned about the projection 108 in the direction of arrow D in FIG. 6. Thus, the engagement portion 107 will be disengaged from the movement limit 61.

Note that the pressing portion 106 is pressed as above when the disc cartridge 1 is inserted into a cartridge holder of the disc recorder/player with which the disc cartridge 1 is compatible as a recording medium and thus a shutter releasing piece of a shutter releasing mechanism provided at the cartridge holder enters the window 42a.

As above, when the shutter member 35 is moved to the position to close the disc-access aperture 13, the engagement portion 107 provided on the shutter movement limiting member 105 installed pivotably on the shutter member 35 is placed opposite to the movement limiter at the cartridge body 5. Then, when the shutter member 35 is going to move in the direction of arrow A in FIG. 1 to open the disc-access aperture 13, the engagement portion 107 abuts the movement limiter (not shown) provided at the cartridge body 5 to limit the shutter member 35 from moving, and thus the shutter plate portion 36 will keep the disc-access aperture 13 closed.

Note that the movement limit at the cartridge body 5 is formed contiguously to one end, facing the disc-access aperture 13, of the circular disc receptacle wall of the disc receptacle 6. The circular disc receptacle wall rises vertically from the inner surface of the lower half 4.

To move the shutter member 35 staying in the position to close the disc-access aperture 13 and limited from moving in order to open the disc-access aperture 13, for example, the shutter releasing piece of the shutter releasing mechanism provided at the cartridge holder in the disc recorder/player is moved to enter the window 42a to press the pressing piece 106 in order to pivot the shutter movement limiting member 105 in the direction of arrow D in FIG. 6. When the shutter movement limiting member 105 is pivoted in the direction of arrow D in FIG. 6, the engagement portion 107 moves toward the one lateral side 8 of the cartridge body 5 and thus it will not be opposite to the movement limiter. Thus, the shutter member 35 is released by the movement limiter from the movement-limited state to be movable in the direction of arrow A in FIG. 1 to open the disc-access aperture 13.

As above, since the shutter member 35 staying in the position to close the disc-access aperture 13 is limited from moving in the direction to open the disc-access aperture 13, so the disc cartridge 1 can positively protect the optical disc 2 housed in the cartridge body 5. Since the shutter member 35 has installed thereon the elastic moving piece 101 with the shutter movement limiting member 105 to limit the shutter member 35 from moving in the direction to open the disc-access aperture 13, so the number of parts of the disc cartridge 1 can be reduced. Further, since the shutter movement limiting member 105 is provided integrally with the second bent piece 46 of the shutter member 35, so the cartridge body 5 may not have any inner space for installation of the shutter movement limiting member 105, which will permit to design the disc cartridge 1 itself smaller.

Figure 8:
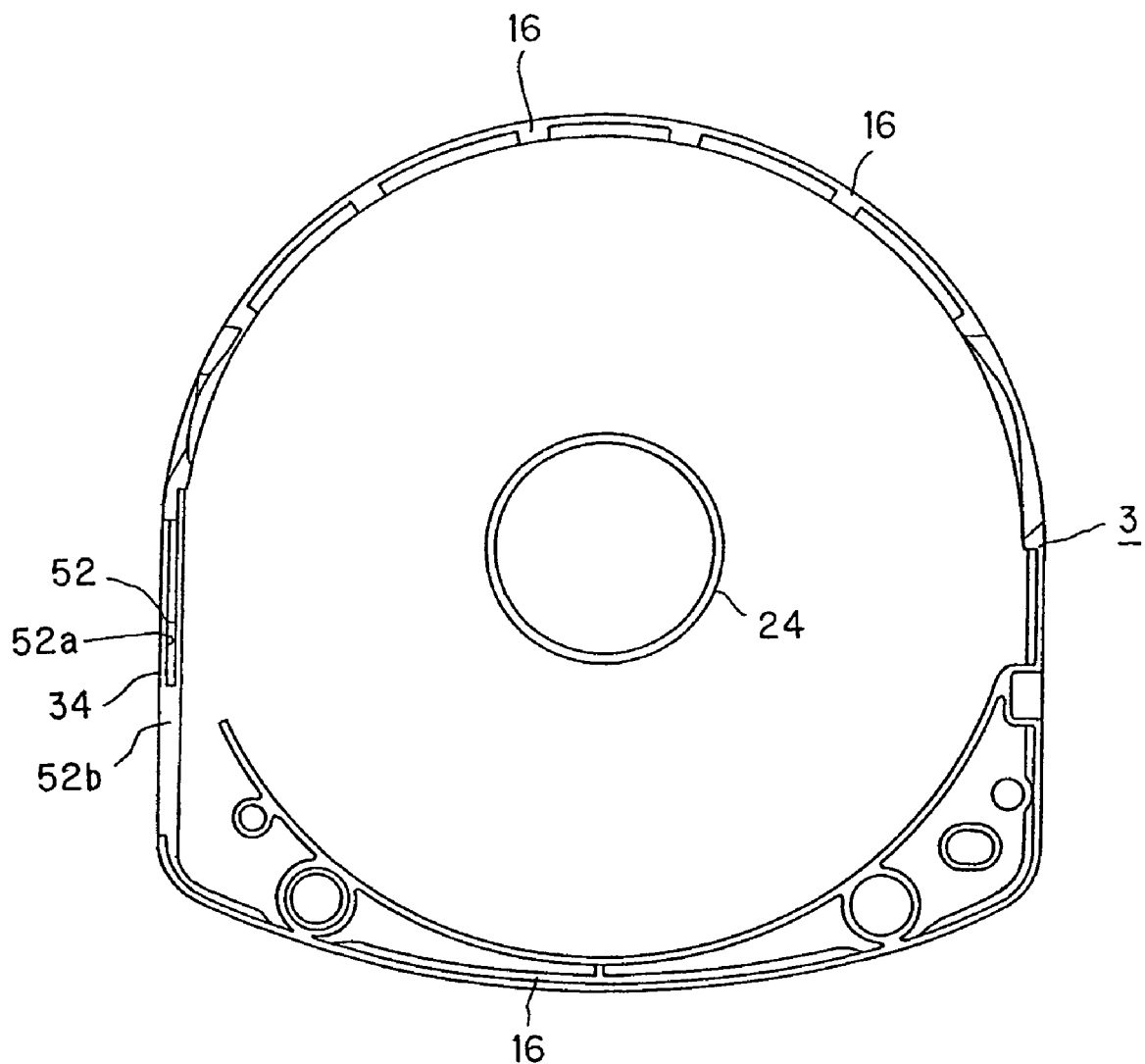
FIG. 8 is a plan view of the lower half.

On the other hand, the sliding guide portion 34 on which the shutter member 35 is supported movably is formed at a portion of the rising peripheral wall 16 provided on the upper half 3 as shown in FIGS. 4 and 8. The sliding guide portion 34 includes a guide recess 51 formed on the outer surface of the rising peripheral wall 16 in parallel with the moving direction of the shutter member 35, and a guide rail portion 52 supported being held tight between the first and second support pieces 43 and 44.

Figure 10A:
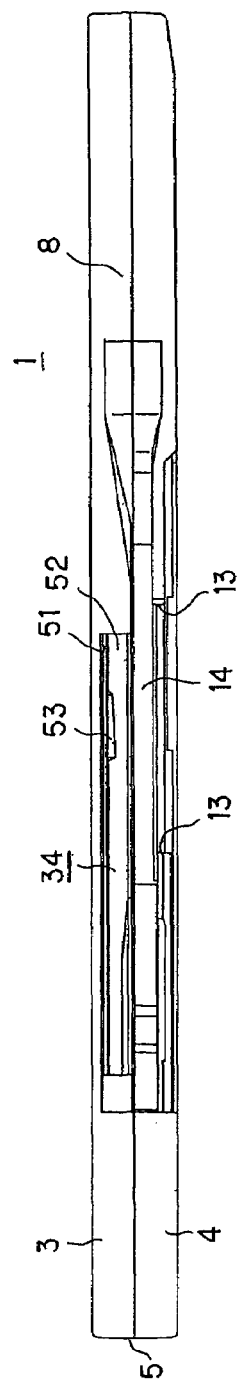
FIGS. 10A, 10B and 10C, are side elevations of the shutter member being assembled to the cartridge body.

The guide recess 51 is formed open at the lateral side 8 of the cartridge body 5 to have a generally C-shaped section, and has formed at the upstream side in the direction to open the disc-access aperture 13 a cut 53 in which the first support piece 43 of the shutter member 35 is to be inserted when the shutter member 35 is installed to the cartridge body 5. The cut 53 is formed by cutting the bottom of the guide recess 51 into a generally rectangular shape. Also, the cut 53 is formed deeper at the downstream side in the direction to open the disc-access aperture 13 correspondingly to the projection 43a of the first support piece 43 of the shutter member 35 (also see FIG. 10(A)). That is, the side of the cut 53 at the downstream side in the direction to open the disc-access aperture 13 is formed deeper than the side at the upstream side in the direction to open the disc-access aperture 13 to have such a taper that the bottom of the cut 53 ascends gradually toward the upper half 3 in a direction from the downstream side in the direction to open the disc-access aperture 13 toward the upstream side. Therefore, since the cut 53 is formed deeper at the downstream side in the direction to open the disc-access aperture 13, the projection 43a of the first support piece 43 formed projected to the downstream side in the direction to open the disc-access aperture 13 can easily be inserted into the cut 53 when assembling the shutter member 35 to the cartridge body 5.

Figure 9:
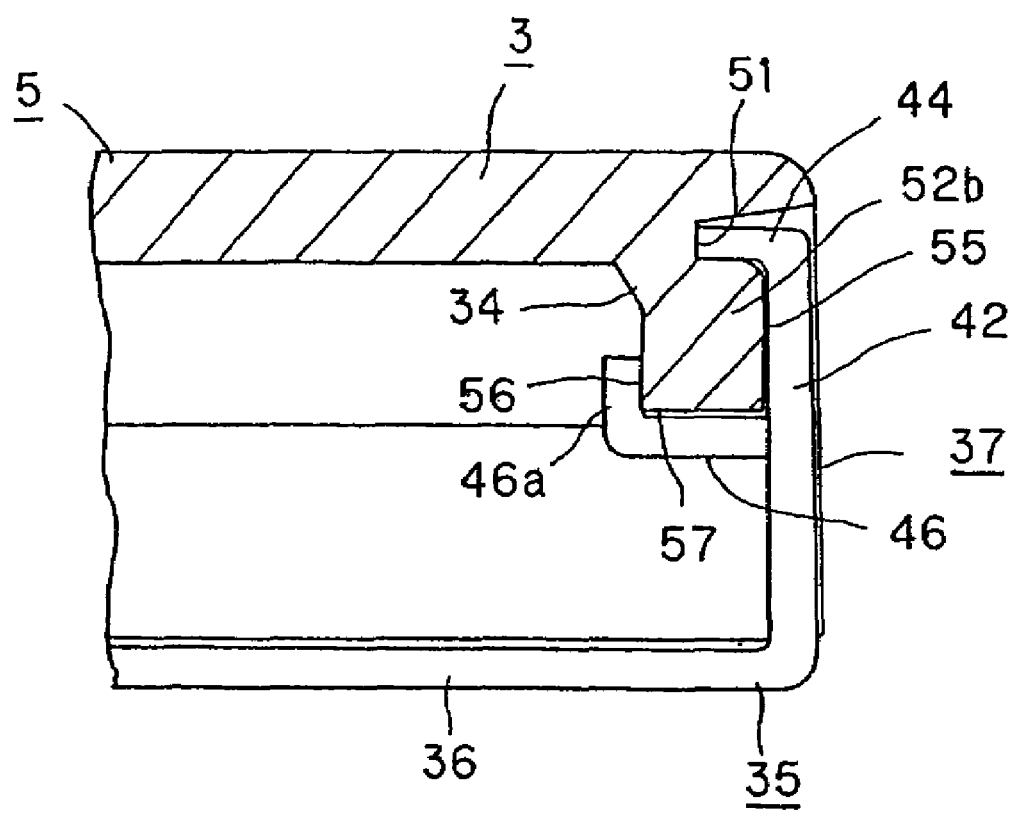
FIG. 9 is a sectional view of the shutter member installed to the cartridge body.

The guide rail portion 52 is to have fitted therein the first and second engagement pieces 45a and 46a of the first and second bent pieces 45 and 46, respectively, formed on the shutter member 35. As shown in FIGS. 8 and 9, the guide rail portion 52 has a guide slit 52a in which the first engagement piece 45a is to be engaged, and a guide wall 52b the second engagement piece 46a is to abut. The outer surface of the guide rail portion 52 is perpendicular to the plane of the upper half 3, and it is opposite to the inner surface of the movement guide piece 42 of the cartridge-supported portion 37 to form a first guide surface 55 that guides the movement of the shutter member 35.

The guide slit 52a is formed on the upper side of the cartridge body 5 perpendicular to the first guide surface 55 and parallel to the lateral side 8 of the cartridge body 5. The guide slit 52a is formed at the upstream side in the direction to open the disc-access aperture 13, and the first engagement piece 45a, bent in a direction perpendicular to the shutter plate portion 36 from the free end of the first bent piece 45 formed bent from the connecting portion 42 toward the shutter plate portion 36, is inserted in the guide slit 52a. Thus, the guide slit 52a guides sliding of the shutter member 35, and the first engagement piece 45a is put into abutment with both ends of the guide slit 52a in the sliding direction, to limit the sliding position of the shutter member 35.

The guide wall 52b is formed at the downstream side in the direction to open the disc-access aperture 13 contiguously to the guide slit 52a, and the second engagement piece 46a formed bent from the free end of the second bent piece 46 in a direction perpendicular to the shutter plate portion 36 abuts the guide wall 52b from inside the cartridge body 5. Thus, the guide wall 52b is held tight between the second engagement piece 46a and second support piece 44 to be slidable. The surface of the guide wall 52b, facing the inner wall of the cartridge body 5, is parallel to the first guide surface 55. It is opposite to the second engagement piece 46a to form a second guide wall 56 that guides the moving direction of the shutter member 35. Further, the end surface of the guide wall 52b is perpendicular to the first and second guide surfaces 55 and 56. It is opposite to the second bent piece 46 to form a third guide surface 57 that guides the moving direction of the shutter member 35.

The shutter member 35 is assembled to the sliding guide portion 34 constructed as above as will be described below. The assembling of the shutter member 35 is to be effected after forming the cartridge body 5 by butt-joining the pair of upper and lower halves 3 and 4 to each other.

To assemble the shutter member 35 to the sliding guide portion 34, the shutter plate portion 36 is first placed to extend over the disc-access aperture 13 formed in the lower half 4 and then the cartridge-supported portion 37 is engaged on the sliding guide portion 34. At this time, while the one lateral side 35a of the shutter member 35, at the downstream side in the direction to open the disc-access aperture 13, is being tilted toward the sliding guide portion 34, the connecting arm 100 and second bent piece 46 are first inserted into the assembling aperture 14 open at the lateral side 8 of the cartridge body 5, and the second engagement piece 46a formed at the free end of the second bent piece 46 is put into abutment with the second guide surface 56 of the guide wall 52b provided on the guide rail portion 52.

Also, the second support piece 44 formed bent from the movement guide piece 42 toward the shutter member 36 is inserted from the projection 44a into the guide recess 51. Since the projection 44a thereof projecting toward the guide recess 51 is first inserted into the guide recess 51 at this time, so the second support piece 44 is led by the projection 44a and thus can easily be inserted into the guide recess 51.

Figure 10B:
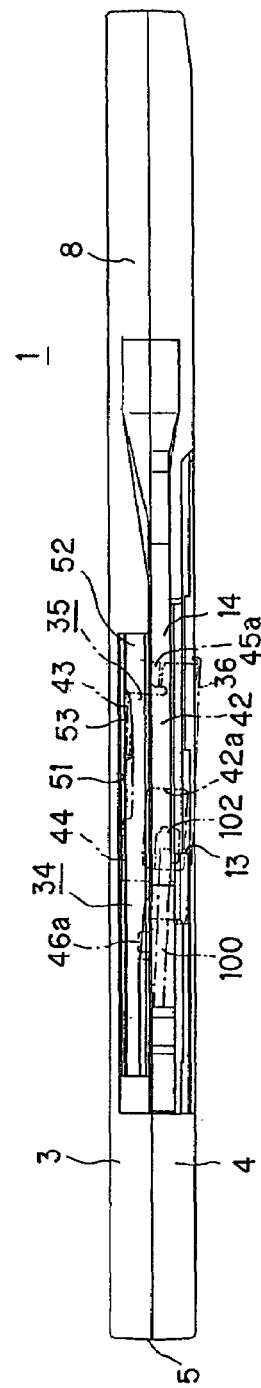
Figure 10C:
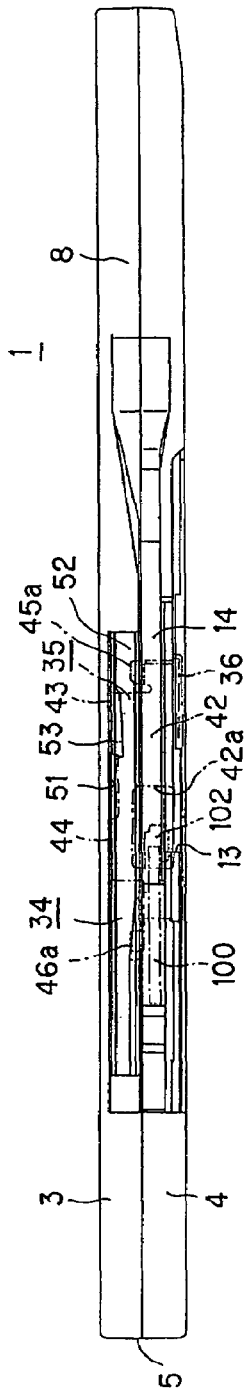

Then, with the other side 35b of the shutter member 35, at the upstream side in the direction to open the disc-access aperture 13, being down-tilted as shown in FIG. 10(B), the first support piece 43 formed at the other side 35b is inserted into the cut 53 formed in the guide recess 51. Since the projection 43a of the first support piece 43 will be inserted into the deeper portion of the cut 53 at this time, so the first support piece 43 can easily be inserted into the cut 53, while the first support piece 43 can easily be inserted into the cut 53 under the guidance of the projection 43a. Next, the first bent piece 45 formed at the other side 35b of the shutter member 35 is inserted from inside the assembling aperture 14 into the cartridge body 5, and pushed into the upper half to insert the first support piece 45a into the guide slit 52a in the guide rail portion 52 and move the first support piece 53 inserted in the cut 43 toward the guide recess 51 as shown in FIG. 10(C).

Thus, the first and second support pieces 43 and 44 of the shutter member 35 are inserted in the guide recess 51, first and second bent pieces 45 and 46 are put in abutment with the third guide surface 57 of the guide rail portion 52, and the first engagement piece 45a is inserted into the guide slit 52a while the second engagement piece 46a is put in abutment with the second guide surface 56 on the rear side of the guide wall 52b. So, the shutter member 35 can be supported slidably on the sliding guide portion 34. At this time, the sliding guide portion 34 is limited from moving in the moving direction of the shutter member 35 and in the thickness direction of the cartridge body 5 perpendicular to the moving direction. Thus, the shutter member 35 is guided and moved stably by the sliding guide portion 34 without any large play.

Also, since the movement guide piece 42 is positioned outside the cut 53 when the shutter member 35 is slid to close the disc-access aperture 13, so the cut 53 in the disc cartridge 1 not inserted in the disc recorder/player is not easily seen from outside.

Note that in the disc cartridge 1 according to the present invention, there is provided the shutter guide member 38 to support the guide support portion 39 formed at the free end of the shutter plate portion 36, prevent the shutter plate portion 36 from lifting from the cartridge body 5 and move the shutter member 35 stably. The shutter guide member 38 is formed by punching a thin sheet of a synthetic resin such as the same polycarbonate resin as used to form the upper and lower halves 3 and 4.

The shutter guide member 38 supports the guide support portion 39 at the free end of the shutter member 36 that opens and closes the disc-access aperture 13. As shown in FIGS. 2 and 3, the shutter guide member 38 is an outer flat surface of the lower half 4 which is one of the sides of the cartridge body 5, located between the circular central aperture 12 and disc-access aperture 13. It is formed to have a sufficient length to support the guide support portion 39 in at least the moving range of the shutter member 35.

The shutter guide member 38 is installed to be flush with the outer surface of the lower half 4 so that it will not project from at least the outer surface of the lower half 4.

The shutter member 35 is installed to the cartridge body 5 with the guide support portion 39 formed at the free end of the shutter plate portion 36 being put in the concavity in which the support portion is slid and with the guide support guide portion 39 being supported on the shutter guide member 38 installed in a guide member installing concavity.

Also, since the shutter member 35 is supported on the sliding guide portion 34 formed at the free end of the rising peripheral wall 16 provided on the upper half 3, so the flat surface of the upper half 3 forming the upper surface of the cartridge body 5 can be largely open as shown in FIG. 1. That is, the shutter member 35 is installed to the cartridge body 5 with no part of the sliding guide portion 34 etc. being opposite to the flat surface of the upper half 3.

In the disc cartridge 1 according to the present invention, the shutter member 35 is installed to the cartridge body 5 not to project from the outer surface of the cartridge body 5. More specifically, the shutter member 35 is installed to the cartridge body 5 to be flush with the outer surface of the cartridge body 5. In the area of the lower half 4 where the shutter plate portion 36 is moved, there is formed a concavity 68 in which the shutter plate portion 36 is moved, as shown in FIGS. 2 and 3. The shutter-sliding concavity 68 is formed sufficiently deep for the shutter plate portion 36 not to protrude from the surface of the cartridge body 5. Also at the one lateral side 8 of the cartridge body 5 where the movement guide piece 42 of the sliding guide portion 34 is moved, a sliding concavity 69 in which the sliding portion is slid is formed contiguous to the shutter-sliding concavity 68. The sliding concavity 69 is also formed sufficiently deep for the movement guide piece 42 not to protrude from the surface of the cartridge body 5.

Since the body 5 of the disc cartridge 1 according to the present invention can be formed with a high precision, so the shutter member 35 to be installed to the cartridge body 5 can also be moved stably in relation to the cartridge body 5 and thus can positively open and close the disc-access aperture 13.

Further, the aforementioned disc cartridge 1 is so constructed that the shutter member 35 is supported by the upper half 3 and moves to open and close the disc-access aperture 13 in the lower half 4. However, since the upper and lower halves 3 and 4 are joined together without any displacement from each other, so the disc-access aperture 13 formed in the lower half 4 can positively be opened and closed by the shutter member 35 supported by the upper half 3.

Note that in the disc cartridge 1 according to the present invention, the cartridge body 5 having the shutter member 35 installed thereon has formed at the one lateral side 8 thereof a guide recess 73 the shutter releasing piece provided at the disc recorder/player enters as shown in FIG. 1.

In the lateral sides 8 and 9 contiguous to the circular front side 7 of the cartridge body 5, there are formed loading concavities 75 and 76 in which part of a cartridge loading mechanism provided at the disc recorder/player with which the disc cartridge 1 is compatible is to be engaged, as shown in FIGS. 1 and 2.

Moreover, in the other lateral side 9 contiguous to the circular front side 7 of the cartridge body 5, there is formed an ejecting engagement concavity 77 in which part of an ejecting mechanism provided at the disc recorder/player is to be engaged, as shown in FIG. 2.

Furthermore, in the lateral side 8 or 9 or bottom of the cartridge body 5, there is provided an identification hole or identification concavity for identification of the type of an optical disc 2 housed in the cartridge body 5.

In the foregoing, there has been described the disc cartridge whose front insertion side is formed circular for a smaller design of the disc cartridge itself. However, the present invention is not limited to this type of disc cartridge but is applicable directly to a disc cartridge including a rectangular cartridge body and a disc cartridge having a disc-access aperture formed on each of the upper and lower sides of the cartridge body with the same advantage as that of the aforementioned disc cartridge.

Also, the disc-shaped recording medium is not limited to any optical disc, but it may be any other disc-shaped recording medium such as magneto-optical disc, cleaning disc for cleaning a write and/or read means for writing and/or reading information signals to an optical disc provided in a disc recording and/or playback apparatus, or the like.

It should be understood by those skilled in the art that various modifications, combinations, sub-combinations and alterations may occur depending upon design requirements and other factors insofar as they are within the scope the appended claims or the equivalents thereof.

What is claimed is:

1. A disc cartridge comprising:
a body having a disc housed rotatably therein;
a driving aperture through which a disc rotation driving mechanism to rotate the disc accesses the disc in the cartridge body and a write and/or read aperture though which information signals are to be written to or read from the disc, both apertures being formed at one side of the cartridge body;
a shutter member including a shutter plate portion to open and close the write and/or read aperture, movement guide piece formed to rise from the shutter plate portion, support pieces provided in a plurality of places spaced from each other in a sliding direction of the shutter plate portion and which are bent from the movement guide piece and supported on a sliding guide portion of the disc cartridge, and engagement pieces projected toward the support pieces to the shutter plate portion to hold the sliding guide portion between themselves and the support pieces;
the sliding guide portion including a guide recess in which the support pieces of the shutter member are to be inserted to be slidable and a guide rail portion on which the engagement pieces are fitted and which supports the shutter member to be slidable; and
a cut formed in the guide recess formed to have such a taper that a depth thereof at an upstream side in a direction to open the write and/or read aperture is larger than that at a downstream side.

2. The disc cartridge according to claim 1, wherein,
the support piece is bent to be longer at one end in the sliding direction than at an other end; and
the cut is formed to have such a taper that a depth corresponding to a longer bent portion of the support piece is larger than a depth corresponding to a shorter bent portion.

3. The disc cartridge according to claim 2, wherein,
the shutter member has a pair of engagement pieces formed in places spaced in the sliding direction; and
a first one of the engagement pieces is engaged slidably in a guide slit formed in the guide rail portion while a second engagement piece holds a guide wall at a side being more downstream in the direction to open the write and/or read aperture than the guide slit in the guide rail portion.

4. The disc cartridge according to claim 1, wherein,
the shutter member has a pair of support pieces formed in places spaced in the sliding direction; and
the second one of the support pieces, provided at the downstream side in the direction to open the write and/or read aperture, is inserted into the guide recess from a longer bent portion and then a first one provided at the upstream side in the direction to open the write and/or read aperture is inserted into the cut formed in the guide recess from the longer bent portion to install the shutter member to the sliding guide portion.

5. The disc cartridge according to claim 1 wherein,
the shutter member has a pair of engagement pieces formed in places spaced in the sliding direction; and
a first one of the engagement pieces is engaged slidably in a guide slit formed in the guide rail portion while a second engagement piece holds a guide wall at a side being more downstream in the direction to open the write and/or read aperture than the guide slit in the guide rail portion.

6. The disc cartridge according to any one of claims 1 to 5 or claim 3, wherein when the shutter member is slid to a position to close the write and/or read aperture, a cartridge support covers the cut.

7. A method of assembling a shutter member to a disc cartridge,
the disc cartridge including:
a body having a disc housed rotatably therein;
a driving aperture through which a disc rotation driving mechanism to rotate the disc accesses the disc in the cartridge body and a write and/or read aperture through which information signals are to be written to or read from the disc, both apertures being formed at one side of the cartridge body;
a shutter member including a shutter plate portion to open and close the write and/or read aperture, movement guide piece formed to rise from the shutter plate portion, support pieces provided in a plurality of places spaced from each other in a sliding direction of the shutter plate portion and which are bent from the movement guide piece and supported on a sliding guide portion of the disc cartridge, and engagement pieces projected toward the support pieces to the shutter plate portion to hold the sliding guide portion between themselves and the support pieces;
the sliding guide portion including a guide recess in which the support pieces of the shutter member are to be inserted to be slidable and a guide rail portion on which the engagement pieces are fitted and which supports the shutter member to be slidable; and
a cut formed in the guide recess formed to have such a taper that a depth thereof at an upstream side in a direction to open the write and/or read aperture is larger than that at a downstream side,
the method comprising the steps of:
inserting, with the shutter member being held at a slant, the support pieces into the cut at the deep side from the upstream side in the direction to open the write and/or read aperture; and
fitting the engagement pieces into the guide recess in the guide rail portion for the support and engagement pieces to catch the guide rail portion between them.

8. The method according to claim 7, wherein,
the support pieces provided count two in number, each of which has a long side at the downstream side in a sliding direction to open the write and/or read aperture;
the shutter member has provided at the downstream side thereof in the sliding direction a limiting member to limit the shutter member from being slid; and
the shutter member is installed to the cartridge body by assembling the limiting member into the cartridge body from an assembling aperture while inserting the first support piece formed at the downstream side in the sliding direction into the guide recess, and then inserting the second support piece at the upstream side in the sliding direction into the guide recess.

* * * * *